US009792325B2

(12) United States Patent
Bruno et al.

(10) Patent No.: US 9,792,325 B2
(45) Date of Patent: Oct. 17, 2017

(54) CONTINUOUS CLOUD-SCALE QUERY OPTIMIZATION AND PROCESSING

(71) Applicant: Microsoft Corporation, Redmond, WA (US)

(72) Inventors: Nicolas Bruno, Bellevue, WA (US); Jingren Zhou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 602 days.

(21) Appl. No.: 13/975,358

(22) Filed: Aug. 25, 2013

(65) Prior Publication Data
US 2015/0058316 A1 Feb. 26, 2015

(51) Int. Cl.
G06F 9/45 (2006.01)
G06F 17/30 (2006.01)

(52) U.S. Cl.
CPC .............................. *G06F 17/30442* (2013.01)

(58) Field of Classification Search
None
See application file for complete search history.

(56) References Cited

U.S. PATENT DOCUMENTS 7,356,524 B2    4/2008  Zurek et al.
8,209,664 B2 *  6/2012  Yu ........................... H04L 12/44
                                                                717/119
8,239,847 B2 *  8/2012  Yu ........................... G06F 8/456
                                                                712/200
2008/0244533 A1* 10/2008 Berg ................... G06F 11/3447
                                                                717/128

OTHER PUBLICATIONS

Liu, Mengmeng, "Efficient Optimization and Processing for Distributed Monitoring and Control Applications", In Proceedings of the on SIGMOD/PODS PhD Symposium, May 20, 2012, 5 pages.
"Ming-Chuan Wu Linkedin", Retrieved on: Aug. 22, 2013, Available at: http://www.linkedin.com/in/mingchuanwu.
"Statistics", Published on: Mar. 16, 2009, Available at: http://technet.microsoft.com/en-us/library/ms190397.aspx.
Chaiken, et al., "SCOPE: Easy and Efficient Parallel Processing of Massive Data Sets", In Proceedings of the VLDB Endowment, vol. 1, Issue 2, Aug. 24, 2008, 12 pages.
"Managing Optimizer Statistics", Published on: Nov. 18, 2011, Available at: http://docs.oracle.com/cd/B19306_01/server.102/b14211/stats.htm.

(Continued)

*Primary Examiner* — Chuck Kendall
(74) *Attorney, Agent, or Firm* — Fiala & Weaver P.L.L.C.

(57) ABSTRACT

Runtime statistics from the actual performance of operations on a set of data are collected and utilized to dynamically modify the execution plan for processing a set of data. The operations performed are modified to include statistics collection operations, the statistics being tailored to the specific operations being quantified. Optimization policy defines how often optimization is attempted and how much more efficient an execution plan should be to justify transitioning from the current one. Optimization is based on the collected runtime statistics but also takes into account already materialized intermediate data to gain further optimization by avoiding reprocessing.

20 Claims, 5 Drawing Sheets

(56) References Cited

OTHER PUBLICATIONS

Ganapathi, et al., "Statistics-Driven Workload Modeling for the Cloud", In IEEE 26th International Conference on Data Engineering Workshops, Mar. 1, 2010, 6 pages.
Sax, Matthias, "Design of an Interface to Gather Execution Statistics of a Dataflow Program", Published on: Jun. 10, 2010, Available at: http://www.dbis.informatik.hu-berlin.de/fileadmin/research/papers/diploma_seminar_thesis/2010_06_Studienarbeit_Matthias_Sax.pdf.
Agarwal, et al., "Re-optimizing Data-Parallel Computing", In Proceedings of the 9th USENIX Conference on Networked Systems Design and Implementation, Apr. 25, 2012, 14 pages.
"Welcome to Apache™ Hadoop®!", Published on: Sep. 7, 2008, Available at: http://hadoop.apache.org/index.pdf.
Avnur, et al., "Eddies: Continuously Adaptive Query Processing", In Proceedings of the ACM SIGMOD International Conference on Management of Data, May 16, 2000, 12 pages.
Battre, et al., "Nephele/PACTs: A Programming Model and Execution Framework for Web-Scale Analytical Processing", In Proceedings of the 1st ACM Symposium on Cloud Computing, Jun. 10, 2010, 12 pages.
Beyer, et al., "Jaql: A Scripting Language for Large Scale Semistructured Data Analysis", In Proceedings of the VLDB Endowment, vol. 4, Issue 12, Aug. 29, 2011, 12 pages.
Borkar, et al., "Hyracks: A Flexible and Extensible Foundation for Data-Intensive Computing", In Proceedings of the IEEE 27th International Conference on Data Engineering, Apr. 11, 2011, 12 pages.
Bruno, et al., "Recurring Job Optimization in Scope", In Proceedings of the ACM SIGMOD International Conference on Management of Data, May 20, 2012, 2 pages.
Chattopadhyay, et al., "Tenzing A SQL Implementation on the MapReduce Framework", In Proceedings of the VLDB Endowment, vol. 4, Issue 12, Aug. 29, 2011, 10 pages.
Cole, et al., "Optimization of Dynamic Query Evaluation Plans", In Proceedings of the ACM SIGMOD International Conference on Management of Data, May 24, 1994, 11 pages.
Dean, et al., "MapReduce: Simplified Data Processing on Large Clusters", In Proceedings of the 6th Conference on Symposium on Operating Systems Design & Implementation, vol. 6, Dec. 6, 2004, 13 pages.
Graefe, Goetz, "The Cascades Framework for Query Optimization", In IEEE Data Engineering Bulletin, vol. 18, Issue 3, Sep. 1985, 10 pages.
Graefe, et al., "Dynamic Query Evaluation Plans", In Proceedings of the ACM SIGMOD International Conference on Management of Data, Jun. 1989, 9 pages.
Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.
Kabra, et al., "Efficient Mid-Query Re-Optimization of Sub-Optimal Query Execution Plans", In Proceedings of the ACM SIGMOD International Conference on Management of Data, Jun. 2, 1998, 12 pages.
Li, et al., "Adaptively Reordering Joins during Query Execution", In IEEE 23rd International Conference on Data Engineering, Apr. 15, 2007, 10 pages.
Lim, et al., "Stubby: A Transformation-based Optimizer for MapReduce Workflows", In Proceedings of the VLDB Endowment, vol. 5, Issue 11, Aug. 27, 2012, 12 pages.
Mark, et al., "Robust Query Processing through Progressive Optimization", In Proceedings of the ACM SIGMOD International Conference on Management of Data, Jun. 13, 2004, 12 pages.
Melnik, et al., "Dremel: Interactive Analysis of Web-Scale Datasets", In Proceedings of VLDB Endowment, vol. 3, Issue 1, Sep. 13, 2010, 10 pages.
Olston, et al., "Pig Latin: A Not-so-Foreign Language for Data Processing", In Proceedings of the ACM SIGMOD International Conference on Management of Data, Jun. 9, 2008, 12 pages.
Raman, et al., "Using State Modules for Adaptive Query Processing", In Proceedings of the 19th International Conference on Data Engineering, Mar. 5, 2003, 12pages.
Stillger, et al., "LEO—DB2's LEarning Optimizer", In Proceedings of the 27th VLDB Conference, Sep. 11, 2001, 10 pages.
Thusoo, et al., "Hive—A Petabyte Scale Data Warehouse Using Hadoop", In Proceedings of the 26th International Conference on Data Engineering, Mar. 1, 2010, 10 pages.
Yu, et al., "DryadLINQ: A System for General-Purpose Distributed Data-Parallel Computing Using a High-Level Language", In Proceedings of the 8th USENIX Conference on Operating Systems Design and Implementation, Dec. 8, 2008, 14 pages.
Zhou, et al., "Scope: Parallel Databases Meet Mapreduce", In the VLDB Journal—The International Journal on Very Large Data Bases, vol. 21, Issue 5, Jun. 28, 2012, 26 pages.
Zhou, et al., "Incorporating Partitioning and Parallel Plans into the Scope Optimizer", In Proceedings of the 26th International Conference on Data Engineering, Mar. 1, 2010, 12 pages.

* cited by examiner

CONTINUOUS CLOUD-SCALE QUERY OPTIMIZATION AND PROCESSING

BACKGROUND

While most processing of computer-readable data is performed by a single computing device comprising a computer-readable storage medium on which the computer-readable data is stored, increasingly the processing of vast quantities of data is performed, where both the computer-readable data itself, and the processing, are distributed across multiple storage and processing devices. For example, data may be stored across multiple computer-readable storage devices that are communicationally coupled to multiple, independent computing devices to accommodate both the quantity of the data and to provide for redundancy and failure tolerance. Furthermore, when attempting to process vast quantities of data, it can be desirable to divide the processing into discrete chunks or execution units and execute such execution units independently of one another and in parallel, thereby completing the processing of such vast quantities of data orders of magnitude more quickly than if such processing has been performed by a single computing device operating in serial. Consequently, for the processing of data that is already distributed across multiple computer-readable storage devices that are communicationally coupled to multiple, independent computing devices, it can be desirable to process such data at the computing devices that are communicationally coupled to the computer-readable storage devices on which such data is already stored, and otherwise minimize the communication of data between computing devices through a network.

The processing that is to be performed on the data is typically defined by reference to declarative programmatic instructions, such as in the form of a script or other like program, which can then be compiled into a sequence of operations, at least some of which can be performed in parallel. Often, multiple different sequences of operations equally yield the result to which the program is directed. In such instances, it can be advantageous to select the most efficient sequence of operations, since such can perform the requested processing utilizing a minimal amount of computing resources. Unfortunately, determining which sequence of operations is most efficient can require foreknowledge that can be impossible to obtain. For example, a choice can exist between first filtering locally stored data and then transmitting the filtered data to another computing device for subsequent repartitioning, or first repartitioning the data locally and transmitting each different partition to other computing devices for subsequent filtering. Determining which choice is most efficient can require knowledge of how aggressive the specified filtering actually is. But while the filter that is applied can be known in advance, the effect it will have on the data can be based on the contents of the data itself and, consequently, may not be able to be known in advance, and may only be learnable when the data is actually filtered. For example, a filter can seek to filter a data set so as to retain only data associated with individuals between the ages of 18 and 25. Such a filter can result in substantially more data when applied to a data set that happens to contain a large number of college students versus the data set that happens to contain a large number of retirement community residents.

Additionally, predicting the amount of computing resources that will be utilized to perform processing that is expressed by arbitrary user code, whose semantics are unknown to the system at compilation time, can be, likewise, difficult or even impossible. To overcome such limitations, modern management of the processing of distributed data utilizes educated guesses and other estimates in order to identify a most efficient sequence of operations to be performed to achieve the requested processing. Such solutions are, however, error-prone and could, in fact, be incorrect by orders of magnitude. Furthermore, such solutions do not address the challenge of estimating user-defined conditions, functions or other like data processing.

SUMMARY

In one embodiment, runtime statistics from the actual performance of operations on the data can be generated and collected, and can be utilized to dynamically modify the sequence of operations that are being performed to accomplish the requested data processing. The dynamic modification of the sequence of operations can utilize the results of operations that have already been performed, or can discard those results and select new operations to be performed.

In another embodiment, an execution unit that comprises the operations that a single computing device is to perform on some or all of the data can be modified to also include operations that can collect runtime statistics. The statistics that are collected can be tailored to the operations that are specified by the execution unit.

In a further embodiment, an optimization policy can define how often an attempt is made to optimize the processing of a set of data based on runtime statistics collected from operations that have already been performed in connection with that processing. Additionally, the optimization policy can define how much more efficient a new sequence of operations would need to be in order to justify transitioning from the current sequence of operations being performed to the new sequence of operations.

In a still further embodiment, in selecting a new optimal sequence of operations based upon runtime statistics collected during the execution of a previously determined optimal sequence of operations, consideration can also be paid to the results of those previously executed operations. To the extent that such results, or intermediate data, can be utilized, and reprocessing can be avoided, the optimality of a new sequence of operations can be increased.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for continuously optimizing the processing of data. The processing to be performed on a set of data can be defined by user-generated programmatic instructions, such as in the form of a script or other like program, which can then be compiled into a sequence of operations. Multiple different sequences of operations can equally yield the result to which the program is directed. Initially, an optimal sequence of operations can be determined based on estimates, and those operations can be distributed to multiple computing devices to be executed in parallel, such as on multiple distinct sets of data. The execution of operations on the data can be statistically quantified by statistics-generating operations that can have been added to the data processing operations prior to the commencement of their execution. Such runtime statistics can be collected and utilized to dynamically modify the sequence of operations that will be executed to accomplish the requested data processing. By being able to dynamically modify execution, continuous optimization of the processing of data can be achieved.

Although not required, the description below will be in the general context of computer-executable instructions, such as program modules, being executed by one or more computing devices. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 1:
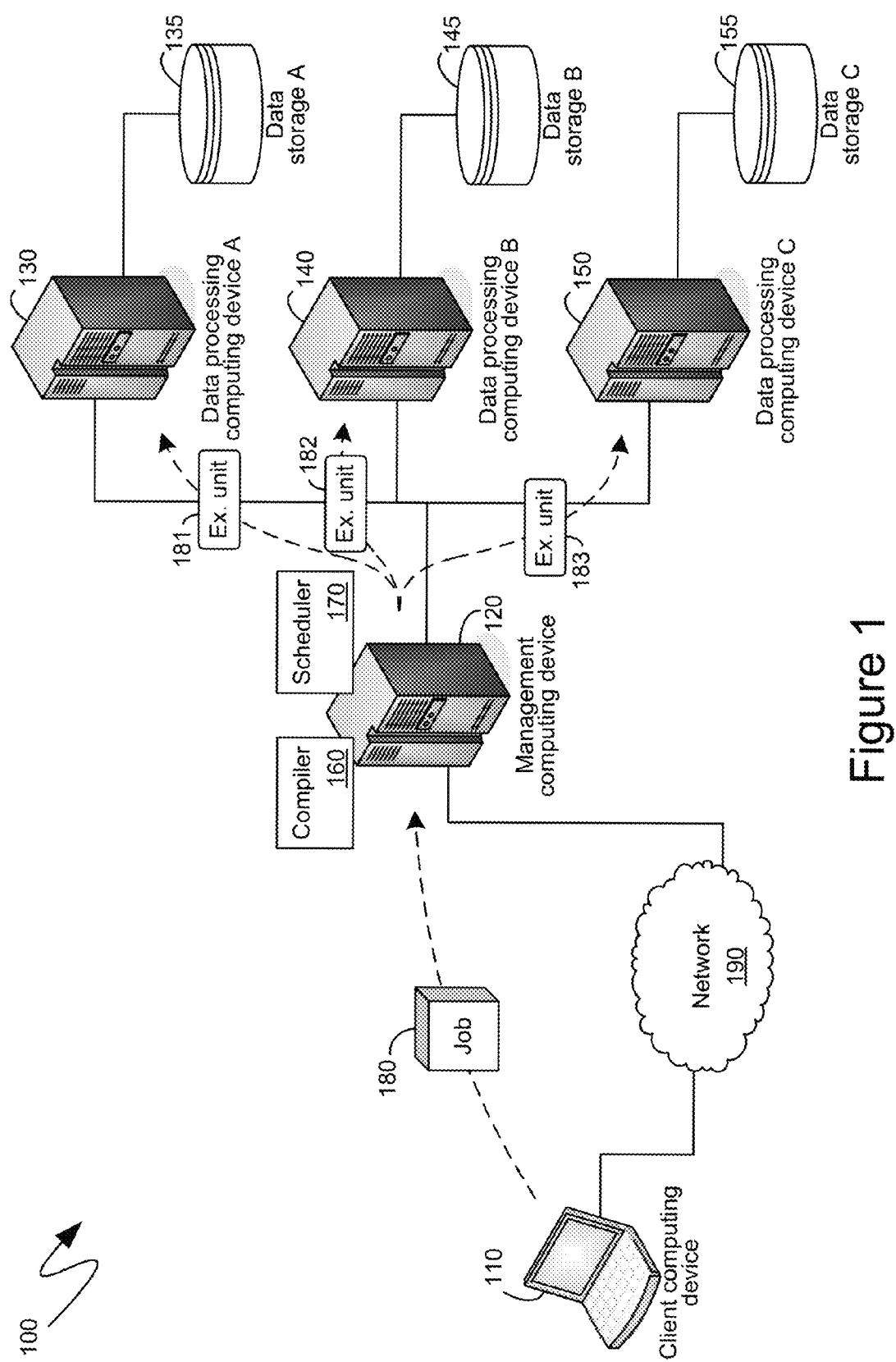
FIG. 1 is a block diagram illustrating an exemplary system for implementing continuous optimization of data processing.

With reference to FIG. 1, an exemplary system 100 is illustrated, providing context for the descriptions below. The exemplary system 100 can comprise data processing computing devices, such as the exemplary data processing computing devices 130, 140 and 150, which can represent a much larger system of computing devices that can be utilized as a single entity for purposes of performing processing and analysis of large sets of data. While the exemplary data processing computing devices 130, 140 and 150 are illustrated as single, individual server computing devices, they can equally represent the individual processors, or processing units, of a single, multi-processor computing device. Consequently, the data processing computing devices 130, 140 and 150 are merely a general representation of data processing capability, rather than an indication of a specific hardware embodiment.

Typically, data processing computing devices, such as the data processing computing devices 130, 140 and 150, have access to computer-readable media, such as the data storage devices 135, 145 and 155, that comprise the capability to store data in a computer-readable format. Access to such data storage devices can be through local communication media, which can be utilized when the data storage device is physically co-located with the data processing computing device, or through network communication media, which can be utilized when the data storage device is physically remote from the data processing computing device. For example, the data storage device 135 is illustrated as being locally communicationally coupled to the data processing computing device 130. By contrast, the data processing computing devices 140 and 150 can access the computer readable data stored on the data storage device 135 via network communications, such as via the network 190 to which the data processing computing devices 130, 140 and 150 are communicationally coupled. As will be recognized by those skilled in the art, local communicational connections can provide substantially greater throughput then network communicational connections. Thus, as a result, a data processing computing device can read data from, and write data to, a data storage device that is co-located with that data processing computing device much more quickly then it could with a data storage device with which it had to communicate over a network. From an efficiency perspective, therefore, it can be desirable to direct data processing to be performed by a data processing computing device that is co-located with a data storage device on which computer readable data that will be processed is stored, since those processes, executing on such a data processing computing device, will be able to access the stored data more quickly. Such a concept is often referred to as "data locality", or a "locality requirement", and the processes described in detail below can take such locality requirements into account in directing tasks to be performed by specific ones of the data processing computing devices.

In addition to the data processing computing devices 130, 140 and 150, and the data storage devices 135, 145 and 155 that are communicationally coupled thereto, respectively, the system 100 of FIG. 1 can also comprise one or more management computing devices, such as the management computing device 120, that can control the manner in which a job 180 is executed by the data processing computing devices 130, 140 and 150. The job 180 can represent any data processing that is desired to be performed on data that can be stored across storage devices, such as the exemplary storage devices 135, 145 and 155, which are communicationally coupled to the data processing computing devices being requested to perform the desired data processing, such as the exemplary data processing computing devices 130, 140 and 150. The processing to be performed on a set of data can be defined by user-generated programmatic instructions, such as in the form of a script or other like program, which can then be compiled into a sequence of operations. The job 180 is intended to represent such a program.

To perform the data processing specified by the job 180 more quickly, the management computing device 120 can, upon receiving the job 180 from the client computing device 110, divide the data processing specified by the job 180 into discrete execution units. For example, the exemplary execution units 181, 182 and 183 can each comprise sequences of operations that can be independently performed by the individual data processing computing devices to which such execution units are assigned, such as the exemplary data processing computing devices 130, 140 and 150, respectively. As will be recognized by those skilled in the art, such parallel processing can result in the completion of the data processing, specified by the job 180, orders of magnitude more quickly than if such specified data processing was performed by a single computing device in serial.

The management computing device 120 can comprise components such as the compiler 160 and the scheduler 170. The compiler 160 can compile the job 180 into sequences of operations that can be executed by one or more of the data processing computing devices, such as the exemplary data processing computing devices 130, 140 and 150. Those sequences of operations can then be divided into execution units, such as the exemplary execution units 181, 182 and 183, which can then be executed by individual ones of the data processing computing devices, such as the exemplary data processing computing devices 130, 140 and 150, respectively. The scheduler 170 can communicate with the individual data processing computing devices and can assign execution units to appropriate ones of the data processing computing devices when such data processing computing devices are capable of accepting and processing the execution units assigned to them.

The manner in which the data processing requested by the job 180 is divided into execution units, such as the execution units 181, 182 and 183, can also impact the efficiency with which the data processing requested by the job 180 is performed. Consequently, the compiler 160 can seek to select a sequence of operations, and can seek to divide those sequences of operations into execution units, in a manner that will maximize the efficiency with which such requested data processing is performed. For example, the management computing device 120 can seek to take advantage of data locality efficiencies by assigning the execution units 181, 182 and 183 to those of the data processing computing devices 130, 140 and 150 that already have, in their local storage, much of the data that the execution units 181, 182 and 183 will be directed to processing, thereby minimizing the communication of data across the network 190. As another example, the management computing device 120 can seek to minimize the amount of data being transmitted over the network 190 by changing the order in which specific operations are performed. For example, if the job 180 required a grouping of filtered data with a predicate over the grouping column that required a large amount of computation, management computing device 120 can have the option of first filtering the data with such an expensive predicate, and then the grouping it, or first grouping the data and then filtering it. If the filtering results in substantially less data, due to the nature of the filter applied and the data to which it is applied, then it can be more efficient to perform filtering first. By contrast, if the filtering does not result in a meaningfully smaller set of data, it can be more efficient to perform the grouping first, and then subsequently filter the data with the expensive predicate over fewer results.

Typically, to identify an optimal manner in which to perform the data processing requested by the job 180, the compiler 160 can first identify two or more sets of operations that can be equivalent in their implementation of the data processing that is requested by the job 180. Subsequently, the compiler 160 can estimate the efficiency with which operations, or groups of operations, will be performed. By summing those estimates together for each of the equivalent sets of operations, and then comparing them, the compiler 160 identify an optimal set of operations, or, more accurately, a set of operations that are deemed to be optimal based on the estimates made by the compiler 160.

Of course, as will be recognized by those skilled in the art, it can be very difficult to determine the effect of specific operations before actually performing the operations on the data. Such difficulties can be due to the fact that user-generated functionality can be nonstandard and difficult to model or predict. Such difficulties can also be due to the fact that data can be difficult to model. For example, a filter that seeks to obtain only data associated with individuals between the ages of 18 and 25, and filter out the remaining data, can be substantially more aggressive when applied to a set of data associated with individuals in a retirement community than when it is applied to a set of data associated with individuals a collegiate community. But absent an actual examination of all of the data itself, which is typically prohibitively time-consuming, it can be difficult to know in advance the relevant aspects of the data that can determine the efficiency of a given operation, such as the aforementioned exemplary filter operation. Consequently, compilers often simply guess as to the efficiency of certain operations for purposes of identifying an optimal set of operations to be sent to the data processing computing devices.

In one embodiment, however, statistical information can be obtained during the requested processing of the data itself, and such statistical information can be returned back to the management computing device 120 to enable optimization of the data processing while the data processing is still occurring. More specifically, and with reference to FIG. 2, the system 200 shown therein illustrates an exemplary series of components, including the compiler 160 and the scheduler 170 that were previously shown in the system 100 of FIG. 1, which can perform continuous optimization of the manner in which the data processing, described by the job 180, is performed.

Figure 2:
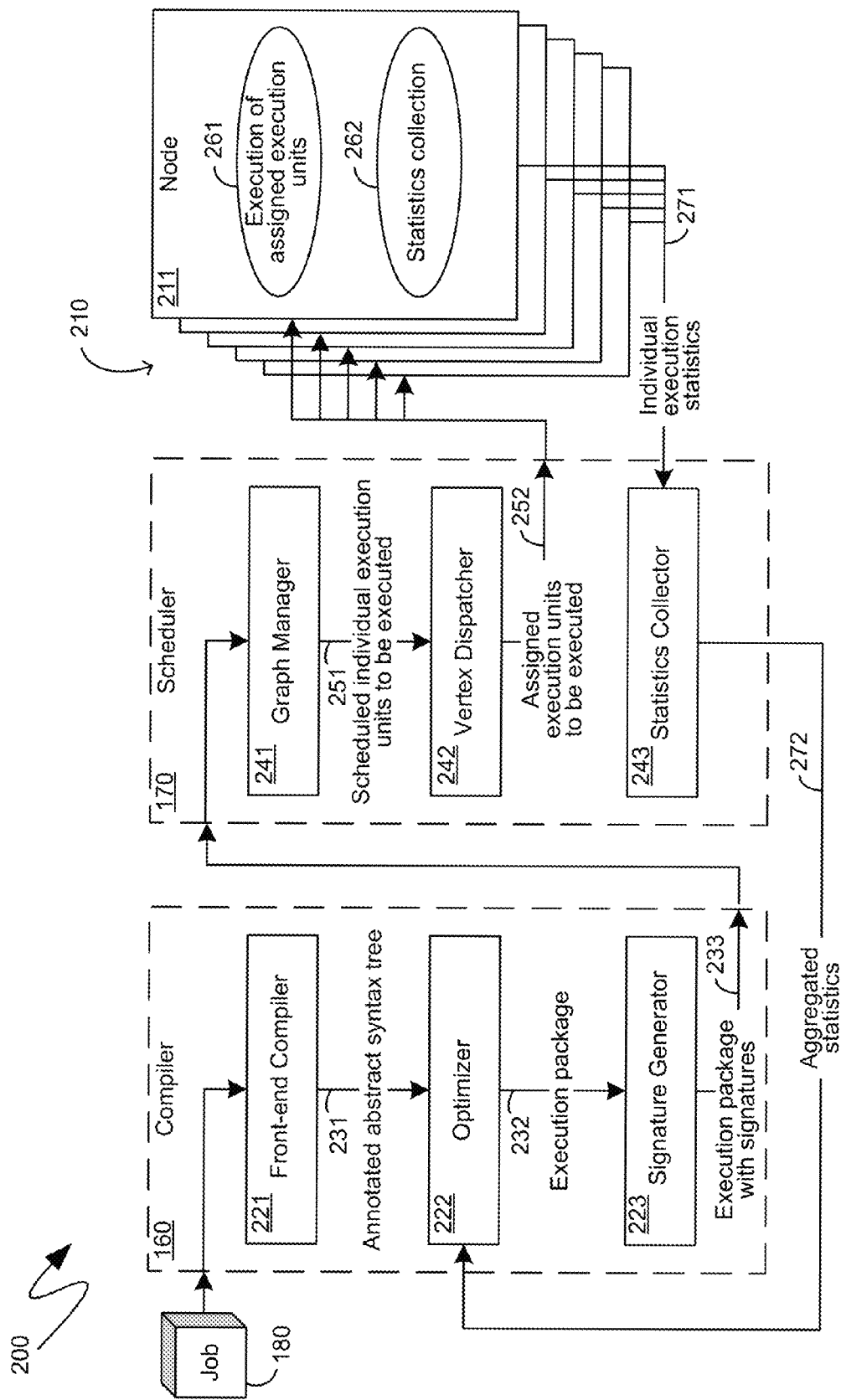
FIG. 2 is a block diagram illustrating an exemplary continuous optimization of data processing.

Initially, as illustrated by the system 200 of FIG. 2, the job 180 can be provided to the compiler 160, which can comprise a front-end compiler component 221. In one embodiment, the front-end compiler 221 can parse the user-generated programmatic instructions of the job 180 to generate the annotated abstract syntax tree 231. More specifically, in such an embodiment, the front-end compiler 221 can perform syntax and type checking to attempt to identify any errors in the user-generated programmatic instructions of the job 180. For example, the front-end compiler 221 can detect if the user-generated programmatic instructions of the job 180 have omitted an end bracket, have a "THEN" statement without a corresponding "IF" conditional, or any other of a myriad of syntactical errors. Similarly the front-end compiler 221 can detect if the user generated programmatic instructions of the job 180 attempt to perform floating-point operations on variables that have been defined as an alphanumeric string, or any other of a myriad of data type mismatches and other like data type centric errors. In addition, the front-end compiler 221 can resolve names, unfold views and macro directives, and perform other like compiler functions.

The annotated abstract syntax tree 231, generated by the front-end compiler 221, can be provided to an optimizer component 222, which, in one embodiment, can also be part of the compiler 160. In such an embodiment, the optimizer 222 can utilize the annotated abstract syntax tree 231 to generate multiple equivalent sets of operations, and can then select one of those sets of operations that the optimizer 222 deems to be the optimal manner in which the data processing specified by the job 180 is to be carried out. As a simple example, if the data to be processed represents information associated with individuals living throughout the United States, and the data processing specified by the job 180 is directed to obtaining information regarding only individuals living in certain states, where such information is to be grouped by state, then one set of operations that can perform such data processing can be a grouping of all of the data by state, followed by a subsequent filtering of the grouped data to retain only data corresponding to the relevant states. Another, equivalent set of operations that can also perform such data processing can be to first filter the data to retain only data corresponding to the relevant states and then grouping such filtered data by state. Such sets of operations are referred to as being "semantically equivalent", and those of skill in the art will recognize that more complex data processing can result in multiple different semantically equivalent sets of operations.

The annotated abstract syntax tree 231 can be utilized by the optimizer 222 to identify and generate multiple such semantically equivalent sets of operations. Subsequently, the optimizer 222 can select one of those semantically equivalent sets of operations to perform the data processing requested by the job 180. Such a selection can be informed by an estimation, by the optimizer 222, as to which of the semantically equivalent sets of operations will perform the data processing requested by the job 180 in the most efficient manner. In one embodiment, the optimizer 222 can estimate a computational "cost" for each operation, or group of operations, and can then sum such an estimated computational cost to obtain an estimated total computational cost for the semantically equivalent sets of operations. As will be understood by those skilled in the art, the computational "cost" of an operation reflects the amount of resources expended to perform the operation, as well as the length of time that such an operation is expected to take. Thus, for example, operations transferring data across a network can be more computationally expensive then operations that process locally stored data.

The set of operations that the optimizer 222 can select to be executed can be the set of operations that are estimated to have the lowest total computational cost. However, as indicated previously, in many instances it can be difficult to accurately estimate the computational cost for an operation. Consequently, in one embodiment, the optimizer 222 can utilize runtime statistics collected from the actual processing of the data to more accurately estimate which of the semantically equivalent sets of operations is optimal. Initially, no statistics may be available, since no data processing has yet been performed, and the optimizer 222 can select one of the semantically equivalent sets of operations, and can generate a corresponding execution package 232.

The generating of the execution package 232, by the optimizer 222, can comprise the generation of individual computer-executable instructions and the combination thereof into an execution unit or an execution stage. As will be known by those skilled in the art, the generation of such an execution package 232 can be based on a determination of which of the operations, from the selected set of operations, can be performed and executed by a single data processing computing device, which, as indicated previously, can be a single physical device, or can merely represent the processing capabilities of a single processing unit, or processing core, in a physical device comprising multiple such processing units or processing cores. For ease of reference, the term "node" will be used to mean a single data processing entity that can perform data processing independent of other such data processing entities.

In one embodiment, the optimizer 222 can also add statistics collection computer-executable instructions to one or more of the execution units of the execution package 232. Such statistics collection computer-executable instructions can generate and collect data quantifying the execution of the other computer-executable instructions in the same execution unit. For example, if the computer-executable instructions of the execution unit were directed to filtering the data, then the added statistics collection computer-executable instructions can be directed to identifying how much of the data is being filtered out and how much is being retained by filtering. Similarly, as another example, if the computer-executable instructions of the execution unit were directed to aggregating certain data, then the added statistics collection computer-executable instructions can be directed to identifying how quickly such aggregation occurs.

Statistics collection computer-executable instructions can, in one embodiment, be added by the optimizer 222 to each operator in the execution package 232. For example, on startup, when a node first begins executing an operator from the execution unit assigned to that node, the operator can have been modified by the optimizer 222 to initialize a statistics object. Subsequently, as the operator produces an output, such as an output row of data that has been processed by the operator, the operator can invoke an increment method on the statistics object, thereby passing in the collected statistics information. For example, the operator could pass in to the statistics object the output row of data it generated. Again, the performance of such functionality can be due to the modification of such an operator, by the optimizer 222, as part of the optimizer 222 providing for the collection of statistics. Lastly, before such an operator completes its processing of the data, it can invoke a finalize method on the statistics object. In one embodiment, the invocation of the finalize method on the statistics object can trigger the execution of additional, dedicated statistics computer-executable instructions that can operate on the statistics object and actually generate the corresponding statistical information.

As indicated, the statistics that are collected can be tailored to, and based upon, the data processing computer-executable instructions of the execution unit whose statistics are being collected. For example, if the data processing being performed by an execution unit is such that cardinality and average row size statistics can be desirable, then the execution unit can be modified with statistics collection computer-executable instructions that can initialize cardinality and row size counters, increment the cardinality counter, add the size of the current row to the size counter for each increment, and then return the cardinality and average row size upon finalization of the statistics object. As another example, if the data processing being performed by an execution unit is user-defined, then statistics collection computer-executable instructions can be added to the execution unit that can monitor the speed with which such user-defined processing is performed by, for example, initializing a timer as part of the commencement of the user-defined data processing and then returning the elapsed time upon finalization of the statistics object. In yet another example, if the data processing is directed to partitioning operators, then statistics collection computer-executable instructions can be added to the execution unit that can utilize one counter for each output partition by initializing an array of such counters with zeros, incrementing a corresponding counter in the array for each increment call performed by the execution unit and then returning the array of counters upon finalization of the statistics object. Should it be necessary, each counter can be added independently to account for merging two histograms. In such a manner, as illustrated by the above examples, statistics collection computer-executable instructions can provide low overhead mechanisms to collect information regarding the efficiency with which the actual processing of data is performed, and other like relevant information that can then be utilized by the optimizer 222 to refine and further optimize the manner in which the job 180 is performed while the execution of the job 180 is still proceeding.

In one embodiment, the compiler 160 can comprise a signature generator 223 that can append, to the execution units of the execution package 232 that is generated by the optimizer 222, unique signatures that can correlate collected statistics to the execution unit from which such statistics were collected. In addition, such signatures can also be utilized to uniquely identify execution units during subsequent optimizations, such as will be described in further detail below, as well as during execution and scheduling. In one embodiment, signatures can uniquely identify a single logical fragment or operation. Consequently, signatures for each execution unit can be generated that will uniquely identify a particular execution unit. In addition, signatures can also be generated for specific operations or groups of operations within an execution unit to enable unique identification of those operations or groups of operations and to enable the collection of statistics quantifying the execution of sub-components of an execution unit, such as statistics quantifying the execution of a single operation or a defined group of operations. One mechanism for identifying which signature to assign to a single logical fragment can be to traverse back through the sequence of rules that was applied during optimizations, such as the optimizations that will be described in detail below, until the initial semantically equivalent expression is reached. This initial expression can then be used as the canonical representation such that all logical fragments producing the same result are grouped together and can be assigned the same signature. To generate the signature itself, in one embodiment, the representation of the canonical expression can be recursively serialized and a hash value of a defined length, such as 64 bits, can be computed, which can serve as the signature.

The execution packet with signatures 233 can be provided to a graph manager 241, which can, in some embodiments, be a component of the scheduler 170. The graph manager 241 can schedule individual ones of the execution units, of the execution package with signatures 233, to be executed on one or more nodes 210, such as the exemplary node 211 shown in FIG. 2. Such scheduling 251 can be communicated to a vertex dispatcher 242 to transmit the assigned execution units 252 to the nodes 210 and monitor the nodes 210 such that, for example, if one or more of the nodes 210 experiences a failure, the vertex dispatcher 242 can assign the execution unit that that node was processing when it failed to another, different node, thereby providing a measure of fault tolerance. The vertex dispatcher 242 can also monitor the execution performed by the nodes 210 to identify when one or more nodes have completed execution of the execution unit that was assigned to them and become available to perform additional execution.

Turning back to the graph manager 241, in one embodiment, the graph manager 241 can generate or utilize a graph definition file that can enumerate all of the stages of the job 180 and the flow of data between those stages. As illustrated by the above examples, the data processing specified by the job 180 can be divided into stages such that the output of one stage act as the input to a subsequent stage. For example, returning to the above examples, the output of the filtering step can be utilized as input to a subsequent grouping or aggregation step. In such an example, the filtering step can be divided across one or more execution units, and the subsequent aggregation step can, likewise, be divided across one or more other execution units. The corresponding graph definition file, therefore, can represent the relationships between those execution units, with the data being generated by one or more of the filtering execution units being consumed by one or more of the aggregation execution units. As will be recognized by those skilled in the art, the graph manager 241, by reference to such a graph definition file, can determine which inputs are necessary preconditions for an execution unit and can cause the vertex dispatcher 242 to assign the execution unit for processing on one or more of the nodes 210 when such inputs become available. As indicated previously, the vertex dispatcher 242 can keep track of the availability of one or more of the nodes 210 and can provide execution units to nodes that are available, or when those nodes become available. Additionally, the vertex dispatcher 242 can take into account other optimizations, such as the priority assigned to one or more of the execution units, and the aforementioned data locality considerations. In the case of the latter, it can be advantageous, as described above, for the vertex dispatcher 242 to direct execution units to be executed by those nodes where the data to be processed by those execution units is already locally stored at those nodes.

The nodes 210, such as exemplary node 211, can perform execution of the assigned execution units 261, and can also execute the statistics collecting computer-executable instructions, such as those describe in detail above, to perform statistics collection 262. As execution of assigned execution units 261 completes on a node, such as the exemplary node 211, the resulting data, or "intermediate data", can be locally stored and can then be obtained, if necessary, by another node that can further, subsequently process such resulting data. Additionally, once the execution of the assigned execution units 261 completes on a node, such as the exemplary node 211, the statistics collected by the statistics collection 262 can be provided to a statistics collector 243 in the form of individual execution statistics 271.

The individual execution statistics 271 can be provided at different periods of time to the statistics collector 243, since each individual execution statistic, from among the individual execution statistics 271, can, in one embodiment, be provided when the corresponding node, such as exemplary node 211, completes the execution of the assigned execution units 261. In an alternative embodiment, the individual execution statistics 271 can be provided whenever a statistics object is finalized, which, as indicated previously, can occur at the completion of the processing of an individual operation, a group of operations, or whatever other unit of processing was instrumented with a specific set of statistics collecting computer-executable instructions. The statistics collector 243 can aggregate the individual execution statistics 271 and can periodically provide aggregated statistics 272 to the optimizer 222. More specifically, in one embodiment, the provision of the aggregated statistics 272, from the statistics collector 243 to the optimizer 222, can occur in an asynchronous manner and can be triggered by an optimization policy. For example, one optimization policy can specify that the optimizer 222 is to receive the aggregated statistics 272 each time an individual execution statistic, from among the individual execution statistics 271, is received by the vertex dispatcher 242 from one of the nodes 210. As another example, another optimization policy can specify that the optimizer 222 is to receive the aggregated statistics 272 each time an entire stage has completed execution across the nodes 210. Other exemplary optimization policies, including optimization policies that specify that the optimizer 222 is to receive the aggregated statistics 272 when more than one, but not all, of the execution units of a stage have completed execution.

Although not specifically indicated in FIG. 2, the individual execution statistics 271 can each comprise and be associated with one or more signatures identifying the execution units, logical fragments, or other like operations from which those execution statistics were collected. Similarly, in providing the aggregated statistics 272 to the optimizer 222, the statistics collector 243 can identify, such as via the signatures, the operations from which those execution statistics were obtained.

In one embodiment, utilizing the aggregated statistics 272, the optimizer 222 can determine whether to modify the manner in which the job 180 is being executed. More specifically, the optimizer 222 can utilize the aggregated statistics 272 to determine whether estimates regarding the processing cost of one or more operations, from among the semantically equivalent sets of operations that the optimizer 222 considered, were, in fact, accurate. If the aggregated statistics 272 reveal that the estimates upon which the optimizer 222 previously based its decision as to which of the semantically equivalent sets of operations to select as the execution package 232 were, in fact, accurate, then the optimizer 222 can determine that no additional optimization is required. Conversely, if, however, the aggregated statistics 272 reveal that the estimates upon which the optimizer 222 had previously based its decision as to which of the semantically equivalent sets of operations to select as the execution package 232 were, in fact, inaccurate, then the optimizer 222 can determine, based upon the information provided by the aggregated statistics 272, whether a different one of the semantically equivalent sets of operations may, instead, be optimal. If the optimizer 222 determines that a different one of the semantically equivalent sets of operations may be optimal, then a new execution package 232 can be generated and ultimately provided to the graph manager 241.

The graph manager 241 can merge the new execution package 232 with the previous execution package and can continue providing execution units to the nodes 210 to continue with the execution of the new execution package 232. For example, in one embodiment, a bottom-up traversal of a new graph definition file corresponding to the new execution package 232 can be performed, and a current graph definition file can be modified to generate a merged graph definition file. Those portions of the current graph definition file that have newer versions thereof in the new graph definition file can be replaced, in the merged graph definition file, with those newer version from the new graph definition file. The portions of the current graph definition file that are not changed by the new graph definition file can be retained in the merged graph definition file and their execution can continue unmodified. And those portions of the new graph definition file that have no analog in the current graph definition file can be added to the current graph definition file as part of the generation of the merged graph definition file. More specifically, in processing the new graph definition file, the graph manager 241 can first select an execution unit in the new graph definition file, and can then attempt to determine whether the selected execution unit is also in the current graph definition file. In one embodiment, such a determination can be performed by finding, in the current graph definition file, an execution unit that performs the same semantic operations as the selected execution unit from the new graph definition file, such as, for example, finding an execution unit in the current graph definition file that has the same signature as the selected execution unit from the new graph definition file. Additionally, or alternatively, consideration can be given to whether the selected execution unit from the new graph definition file consumes inputs from the same children execution units as the execution unit deemed to be equivalent in the current graph definition file. If no such equivalence can be found between the selected execution unit from the new graph definition file and an existing execution unit in the current graph definition file, the selected execution unit can be added to the current graph definition file as part of the generation of the merged graph definition file. Conversely, if an equivalence is found between the selected execution unit from the new graph definition file and an existing execution unit in the current graph definition file, a further determination can be made as to whether the selected execution unit from the new graph definition file is an updated version of an existing execution unit in the current graph definition file. If it is not, then a determination can be made that the existing execution unit from the current graph definition file is to be retained in the merged graph definition file. If, however, the selected execution unit from the new graph definition file is an updated version of an existing execution unit in the current graph definition file, then the existing execution unit in the current graph definition file can be replaced by the selected execution unit from the new graph definition file as part of the generation of the merged graph definition file.

As part of the merging of the new graph definition file with an existing graph definition file, there may be currently executing execution units whose output is no longer consumed by any execution unit in the resulting merged graph definition file. In such an instance, in one embodiment, execution of those execution units can be ceased and the data generated by such execution units can be discarded. Additionally, as part of the merging of the new graph definition file with an existing graph definition file, to the extent that a new execution unit is added as part of the merged graph definition file, the outputs of such an execution unit can be mapped with those execution units of the merged graph definition file that will consume such outputs and, likewise, the inputs of such an execution unit can be mapped with those execution units of the merged graph definition file that will output the data that will be consumed by the selected execution unit. In such a manner, to the extent that execution units from the prior graph definition file are retained in the merged graph definition file, the output data already generated by the already completed processing of such execution units can be immediately available for subsequent processing and, in such a manner, efficiency can be achieved by avoiding the re-performance of such processing.

In one embodiment, execution units from a prior graph definition file, which have been merged into a merged graph definition file, and whose outputs can be consumed by subsequent execution units in the merged graph definition file, can have yet to complete processing. In such an instance, the processed data generated by such execution units can be only in an intermediate state. However, in generating the new execution package 232, the optimizer 222 can, in such an embodiment, have considered such execution units to have already completed processing and, consequently, such execution units may not be part of the new graph definition file. Consequently, in such an embodiment, a new execution unit can be added to the merged graph definition file and the new execution unit and the prior execution unit, which had not yet completed processing, can both be present in the merged graph definition file and can be linked such that the new execution unit can continue the processing initially started, but not yet completed, by the prior execution unit. In such a manner, processed data that is only in an intermediate state can still be utilized.

Figure 3:
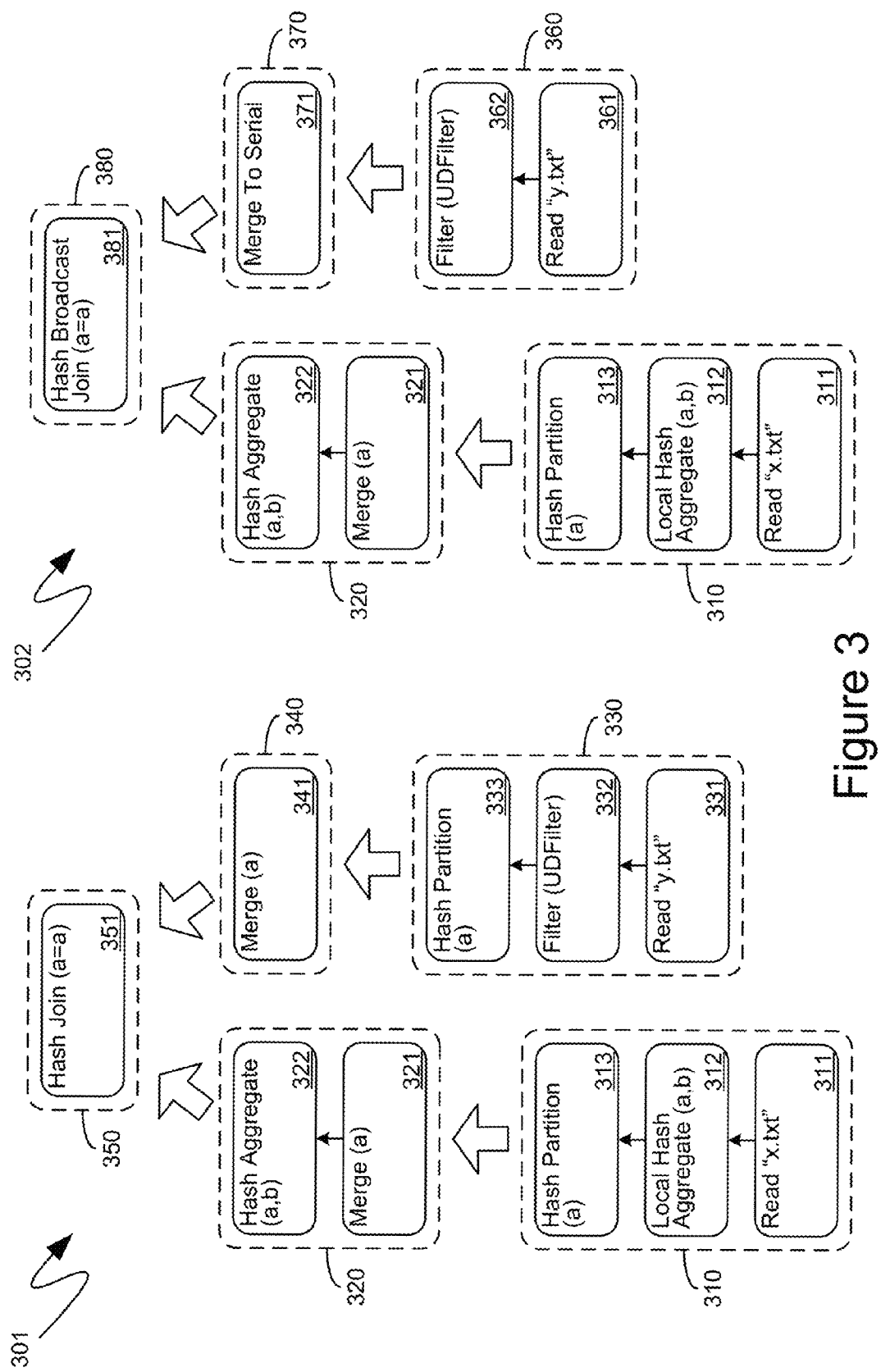
FIG. 3 is a block diagram illustrating two exemplary alternative sequences of operations.

Turning to FIG. 3, two semantically equivalent sets of operations 301 and 302 are illustrated so as to provide greater context for the descriptions of the operation of the optimizer 222, shown in FIG. 2. The two semantically equivalent sets of operations 301 and 302 can represent an implementation of an exemplary data processing script, namely the exemplary script:

```
R = SELECT a,
         b,
         UDAgg(c) AS sc
    FROM "x.txt"
    USING XExtractor
    GROUP BY a, b
S = SELECT a,
         d
    FROM "y.txt"
    USING YExtractor
    WHERE UDFilter(a, d) > 5
SELECT *
FROM R JOIN S ON R.a = S.a
```

As can be seen, such an exemplary script extracts one set of data from a file called "x.txt", and another set of data from a file called "y.txt", using the extractors "XExtractor" and "YExtractor", respectively, which are meant to represent user-defined functions that can be difficult to accurately estimate for purposes of identifying an optimal method of performing the data processing described by the exemplary script. The exemplary script can proceed to group the data extracted from "x.txt" by categories "a" and "b" and can also filter the data extracted from "y.txt" based on the values of categories "a" and "d". These intermediate results are then joined to form the ultimate result sought by the exemplary script.

The set of operations 301, shown in FIG. 3, represents one set of operations that can accomplish the data processing specified by this exemplary script. For example, one execution unit, namely the execution unit 310, can perform the function of reading the file "x.txt", as indicated by the operation 311. The output of the operation 311 can act as input to the operation 312 which can perform a local hash aggregate on such data by categories "a" and "b". The output of the operation 312 can then act as input to the operation 313, which can perform a hash partition on such input data. As will be recognized by those skilled in the art, the execution unit 310 can be executed by multiple nodes in parallel, with each node reading a portion of the file "x.txt" that is locally stored to such a node, and then performing the subsequent operations. The output of each of the individual executions of the execution unit 310 across the multiple nodes, in parallel, can be provided to the execution unit 320, where, initially, as illustrated by the operation 321, such input data can be merged based on the category "a", and then the output of such at operation 321 can be provided as input to the operation 322, which can perform a hash aggregate on the categories "a" and "b".

Continuing with the exemplary set of operations 301, another execution unit, namely the execution unit 330, can perform the function of reading the file "y.txt", as shown by the operation 331. The output of the operation 331 can be provided as input to the operation 332, which can apply a filtering process to filter out the data read from the file "y.txt". The output of the operation 332, can then be provided as input to the operation 333, which can perform a hash partition on such data based on the category "a". As with the execution unit 310, the execution unit 330 can be executed by multiple nodes in parallel, with each node reading the portion of the "y.txt" file that is locally stored at such a node. The output of the execution unit 330 can be provided to the execution unit 340, which can comprise a single operation 341 that can merge the data received from the various parallel executions of the execution unit 330 based on the category "a". The output of the execution units 320 and 340 can then be provided as input to the execution unit 350 that can, itself, comprise single operation 351, which can join the two input data sets by the category "a".

The set of operations 302 can be semantically equivalent to the above-described set of operations 301. In particular, and as illustrated in FIG. 3, the same execution units 310 and 320 can be part of the set of operations 302. However, as far as the data obtained from the file "y.txt" is concerned, the set of operations 302 can comprise execution units 360 and 370 that can differ from the execution units 330 and 340, but the execution units 360 and 370, in combination with the execution unit 380 can be semantically equivalent to the above-described execution units 330 and 340, in combination with the above-described execution unit 350. For example, the execution unit 360 can comprise a read operation 361 that can be equivalent to the read operation 331 and a filter operation 362 that can be equivalent to the filter operation 332, both of which were described above. The execution unit 360 can, however, lack the hash partition performed by the operation 333 of the execution unit 330. Instead, the output of the execution unit 360 can be provided to an execution unit 370 that can comprise a merge-to-serial operation 371. Subsequently, rather than performing a hash join, as called for by the operation 351 of the execution unit 350, the execution unit 380 can perform a hash broadcast join operation 381.

More colloquially, the primary difference between the two semantically equivalent sets of operations 301 and 302 can be the presence of the additional hash partition operation 333, in the execution unit 330, that is not present in the corresponding execution unit 360 and, then, to compensate for the lack of such a hash partition operation, a hash broadcast join operation 381 can be performed as part of the execution unit 380, while the corresponding execution unit 350 only comprises a hash join operation 351. In evaluating which of the two semantically equivalent sets of operations 301 and 302 should be selected to perform the data processing requested by the above exemplary script, an optimizer can seek to determine how selective is the filter of the operations 332 and 362. If such a filter is selective, then the set of operations 302 can be optimal, because such a set of operations can avoid the additional hash partition operation 333, and the minimal amount of data being output by the execution unit 360, due to a selective filter operation 362, can minimize the computational cost of the hash broadcast join operation 381. By contrast, if the filter is not selective, then the set of operations 301 can be optimal, since a hash broadcast join, as will be recognized by those skilled in the art, can send all of one set of data to each of another set of data, and, consequently, when applied to two large data sets, can be computationally expensive. In such an instance, the hash broadcast joint operation 381 can be substantially more computationally expensive than performing a hash partition operation 333, as part of the parallel execution of the execution unit 360 across multiple nodes. As indicated previously, however, it can be difficult to determine in advance how selective the filter of the operations 332 and 362 will be.

Consequently, in one embodiment, one of the two semantically equivalent sets of operations 301 and 302 can be selected by an optimizer and then execution statistics, precisely quantifying how selective the filter operation 332 is, can be received prior to proceeding with the execution of the hash partition operation 333. With such execution statistics, a definitive determination can be made of how much data remains after the filter operation 332. If little data remains, a new set of operations, namely the set of operations 302, can be selected and the execution unit 330 can be replaced with the execution unit 360, such as in the manner described in detail above. Similarly, the execution unit 370 can replace the execution unit 340 and the execution unit 380 can replace the execution unit 350. More specifically, and as indicated previously, in one embodiment, a bottom-up traversal can reveal that the execution unit 370 corresponded to the formerly selected execution unit 340, and, consequently, the execution unit 340 can be replaced by the execution unit 370. Similarly, such a bottom-up traversal can reveal that the execution unit 380 corresponded to the formerly selected execution unit 350 and, consequently, the execution unit 350 can be replaced by the execution unit 380.

In the illustrated example, all of the data from the execution of operations 331 and 332 can be retained and utilized when the set of operations 302 is selected in place of the set of operations 301, since such data acted as both the input to the operation 333, as part of the formerly selected set of operations 301, as well is the input to the execution unit 370, as part of the newly selected set of operations 302. To facilitate the use of such intermediate data that has already been processed, or "materialized", the optimizer can take into account, not only execution statistics, but can also consider what intermediate data has already been materialized.

In one embodiment, therefore, two data structures can be maintained, such as by the scheduler 170. One such data structure can be a statistics package that can be a global collection of signatures and corresponding aggregated statistics that can have been received from nodes that can have completed execution of one or more operations from which the statistics were collected. A second data structure can be a materialization package that can also be a global collection, except this one correlating signatures to the intermediate results, generated by the processing identified by those signatures, which can have already been materialized. Additionally, the materialization package can, in one embodiment, include information regarding the fraction of nodes assigned a particular execution unit, in parallel, that have already completed execution of the execution unit assigned to them.

In one embodiment, a merge method, such as can be defined by the statistics package, can be utilized to update the statistics in the statistics package as statistics information is received, such as when a node completes execution of an operation or group of operations. An analogous merge method can be utilized to update the materialization package, except that the materialization package can, in one embodiment, be updated, not with the completion of execution of every discrete operation, but rather only when an entire execution unit is completed.

The continuous optimization that can be performed by an optimizer, such as the optimizer 222, shown in FIG. 2, based on the statistics and materialization information, can, in one embodiment, comprise two phases. In such an embodiment, as a first phase, the optimizer can generate new semantically equivalent logical expressions and group equivalent logical expressions from a new plan and a currently executing plan together. For example, the optimizer, in generating new semantically equivalent logical expressions, can transform an associative reducer into a local and global pair, or vice-versa. Similarly, as another example, the optimizer can attempt to generate new semantically equivalent logical expressions by changing when predicate selection is performed so that it is performed sooner in the processing. Subsequently, as part of a second phase, logical operators from those logical expressions can be converted to operations, such as those illustrated above, and cost can be determined for each operation based upon the statistics received and taking into account any intermediate data that can have already been materialized.

In considering a statistics package, an optimizer can perform verifications of the corresponding signatures and can correlate those signatures, and the associated statistical information, with signatures computed by the optimizer for the currently executing operations, as well as for a potential new set of operations. As part of such a correlation, the optimizer can perform lookups in the statistics package based upon signatures computed by the optimizer. Such lookups can enable the optimizer to retrieve statistics that can be of particular relevance to the decisions being made by the optimizer. For example, as indicated above, in choosing between the semantically equivalent sets of operations 301 and 302, the optimizer can seek to estimate how much data will remain after the performance of the filter operation 332. In such an exemplary scenario, the optimizer can perform a lookup into an existing statistics package based upon the signatures of, for example, the filter operation 332, to determine if such an operation has already been executed and, if it has, how much data was left as the output of such an operation. If the statistics retrieved by such a signature-based lookup reveal that the filter operation 332 is not sufficiently aggressive, then the optimizer can, rather than guessing, simply use that information when determining an overall computational cost to compare the semantically equivalent sets of operations 301 and 302.

Additionally, in one embodiment, an optimizer can also consider a materialization package, such as that described above. In such an embodiment, the optimizer can perform a lookup into the materialization package for each signature that the optimizer performs a lookup into the statistics package in order to determine if any intermediate results have been materialized. Thus, returning to the above example, upon performing such a lookup, the optimizer can be provided with information indicating that the filter operation 332 had completed and the intermediate results represented by the output of the filter operation 332 had been materialized. In such an example, the processing cost of the filter operation 332 can, thereby, be set to zero by the optimizer, for purposes of determining which of the equivalent sets of operations 301 and 302 are optimal, since such a filter operation 332 can already be complete. If, as another example, the filter operation 332 had materialized some intermediate results, but had not yet been completed across all of the nodes to which it was assigned, then the materialization package can so indicate, and the optimizer can set a reduced, but non-zero, processing cost for the filter operation 332. For example, the cost of such a partially completed filter operation 332 could be a fraction of the estimated cost of the whole filter operation 332 that is equivalent to the fraction of nodes that have completed their processing of the filter operation 332. In such a manner, the optimizer can take into account materialized, and partially materialized, intermediate data.

Figure 4:
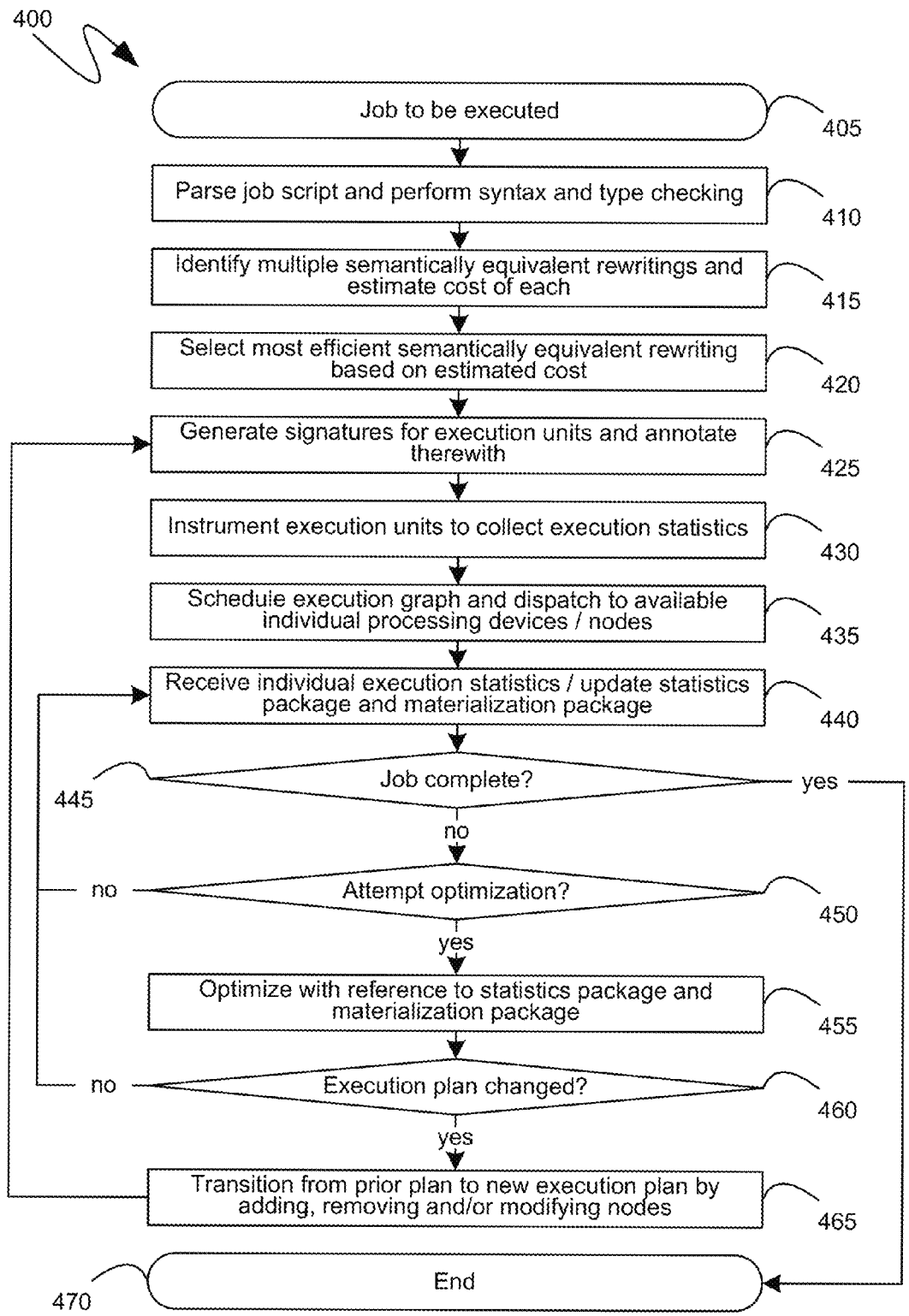
FIG. 4 is a flow diagram of an exemplary continuous optimization of data processing.

Turning to FIG. 4, the flow diagram 400 shown therein illustrates an exemplary series of steps that can be performed to accomplish continuous optimization of data processing. Initially, as illustrated by step 405, the job to be executed can be received. Subsequently, at step 410, the job can be parsed and syntax and type checking can be performed, such as in the manner described in detail above. At step 415, multiple semantically equivalent sets of operations can be identified and an estimated cost can be determined for each. A most efficient one of the semantically equivalent sets of operations can be selected at step 425 to be executed to perform the data processing specified by the job that was received at step 405.

At step 425, signatures can be generated to uniquely identify execution units, or other like collections of operations. As indicated previously, the generation of signatures, such as at step 425, can be based on the canonical representation of the operator tree obtained from the semantically equivalent expression for the execution unit identified by the signature. At step 430, the execution units can be instrumented with computer-executable instructions to collect execution statistics. As indicated previously, such computer-executable instructions can be directed to the recordation of the sort of statistics that are relevant given the processing being performed by the execution units. For example, an execution unit comprising user-defined operators can be instrumented with computer-executable instructions collecting time-based execution statistics, such as computer-executable instructions, directed to starting and stopping timers, that can be triggered by appropriate events. Similarly, as another example, an execution unit comprising operators directed to the processing of specific data rows can comprise computer-executable instructions that can be directed to incrementing counters, such as in a statistics object, for each row that is processed.

At step 435, an execution graph can be generated and the execution of execution units by individual nodes can be scheduled and the execution units can be dispatched to those nodes. At step 440, individual execution statistics can be received as the execution of the execution units is performed by the nodes. Such execution statistics can be aggregated and a statistics package can be updated accordingly. Additionally, as part of step 440, information regarding the materialization of intermediate data can be received and a materialization package can be updated accordingly, such as in the manner described in detail above. If the data processing for the job received at step 405 finishes, such as can be determined at step 445, the relevant processing can end step 470. However, if the data processing is not yet complete, then a determination can be made, at step 450, as to whether to attempt optimization. As indicated previously, such a determination can be based on be predetermined optimization policy that can specify how often dynamic optimization of data processing is to be attempted. For example, one optimization policy can be to attempt optimization each time execution statistics are received from a node that has completed processing. As another example, another optimization policy can be to attempt optimization each time the processing for an entire stage is completed and the execution statistics thereof are received. If, according to such a policy, it is not yet time to attempt optimization, then processing can return to step 440, where additional execution statistics and materialization information can be received.

Alternatively, if, at step 450, it is determined, based on an optimization policy, that an optimization is to be attempted, such an optimization can be attempted at step 455 with reference to the statistics package and materialization package maintained at step 440. As indicated previously, in one embodiment, such an optimization utilizes the information from the statistics package to update its estimates of the processing cost of the operations of semantically equivalent sets of operations, and then determines whether the semantically equivalent set of operations that was previously selected, and is currently being executed, remains the most efficient in light of the information received from the execution statistics. If the currently selected set of operations is no longer deemed to be most efficient, a further determination can be made to quantify how much better an alternative semantically equivalent set of operations would be. In such a manner, the costs of reconfiguration and re-optimization can be avoided unless the anticipated efficiency gains exceed such costs. If, as part of the optimization at step 455, is determined that the semantically equivalent set of operations currently being executed should not be changed, then processing can return step 440 and await further execution statistics and materialization information. Conversely, if the optimization of step 455 indicates that a meaningfully more efficient semantically equivalent set of operations can be selected, then, at step 460, a determination can be made to change to the execution of such a new set of operations, and, at step 465, execution can be transitioned from the previously selected set of operations to the newly selected set of operations. Processing can then return to step 425 to generate signatures for the new set of operations to be executed, such as in the manner described in detail above.

Figure 5:
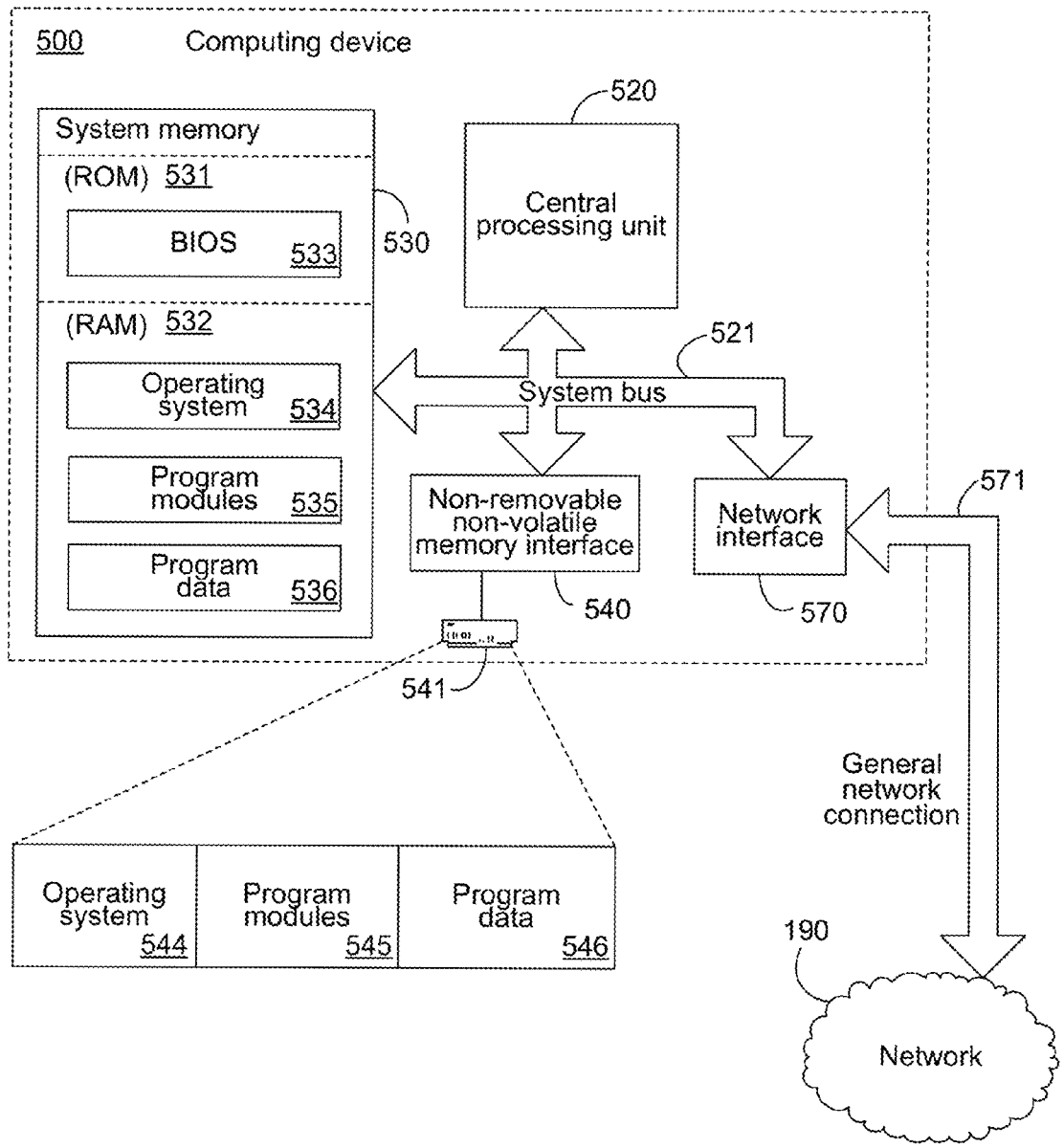
FIG. 5 is a block diagram of an exemplary computing device.

Turning to FIG. 5, an exemplary computing device 500 is illustrated, comprising, in part, hardware elements that can be utilized in performing and implementing the above described mechanisms. The exemplary computing device 500 can include, but is not limited to, one or more central processing units (CPUs) 520, a system memory 530 and a system bus 521 that couples various system components including the system memory to the processing unit 520. The system bus 521 may be any of several types of bus structures including a memory bus or memory controller, a peripheral bus, and a local bus using any of a variety of bus architectures. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 500 may operate in a networked environment via logical connections to one or more remote computers. The logical connection depicted in FIG. 5 is a general network connection 571 to the network 190 described previously. The network 190 to which the exemplary computing device 500 is communicationally coupled can be a local area network (LAN), a wide area network (WAN) such as the Internet, or other networks. The computing device 500 is connected to the general network connection 571 through a network interface or adapter 570, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

Among computer storage media, the system memory 530 comprises computer storage media in the form of volatile and/or nonvolatile memory, including Read Only Memory (ROM) 531 and Random Access Memory (RAM) 532. A Basic Input/Output System 533 (BIOS), containing, among other things, code for booting the computing device 500, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. These components can either be the same as or different from operating system 534, other program modules 535 and program data 536. Operating system 544, other program modules 545 and program data 546 are given different numbers here to illustrate that, at a minimum, they are different copies.

As can be seen from the above descriptions, mechanisms for continuously optimizing data processing have been presented. In view of the many possible variations of the subject matter described herein, we claim as our invention all such embodiments as may come within the scope of the following claims and equivalents thereto.

We claim:

1. One or more computer-readable storage devices comprising computer-executable instructions for optimizing a performance of a data processing job, the computer-executable instructions directed to steps comprising:
   selecting a computer-executable program that includes a first set of operations to carry out the data processing job;
   augmenting at least some operations, of the first set of operations, in the computer-executable program to comprise computer-executable instructions for collecting execution statistics quantifying execution of the augmented operations, the execution statistics being indicative of at least the runtime performance of the first set of operations;
   receiving at least some of the execution statistics prior to the data processing job having been completed;
   selecting, based on the received execution statistics, a second set of operations that are semantically equivalent to the first set of operations, the semantically equivalent second set of operations different but functionally equivalent to the first set of operations and configured to provide a same result as the first set of operations; and
   proceeding with the data processing job with the second set of operations.

2. The one or more computer-readable storage devices of claim 1, comprising further computer-executable instructions for dividing the first set of operations into execution units and assigning at least some of the execution units to multiple processing nodes to be executed in parallel by the multiple processing nodes.

3. The one or more computer-readable storage devices of claim 1, wherein the computer-executable instructions for collecting the execution statistics comprise computer-executable instructions for initializing data size counters and then incrementing the data size counters each time a corresponding augmented operation processes another set of data.

4. The one or more computer-readable storage devices of claim 1, wherein the computer-executable instructions for collecting the execution statistics comprise computer-executable instructions for initializing a timer and providing a timer value upon completion of a corresponding augmented operation.

5. The one or more computer-readable storage devices of claim 1, comprising further computer-executable instructions for determining a signature for the augmented operations; wherein the received execution statistics comprise signatures identifying operations from which they were collected.

6. The one or more computer-readable storage devices of claim 1, comprising further computer-executable instructions for:
   determining, prior to the selecting the computer-executable program that includes the first set of operations, an aggregate processing cost for each of the first set of operations and the second set of operations, the first and second sets of operations being semantically equivalent, the determining comprising estimating a processing cost for operations of the first set of operations and for operations of the second set of operations;

wherein the computer-executable instructions for selecting the second set of operations based on the received execution statistics comprise computer-executable instructions for determining, from the received execution statistics, an actual processing cost of at least one of the first set of operations, the determined actual processing cost differing from an estimated processing cost for the at least one of the first set of operations such that the aggregate processing cost for the second set of operations is now lower than the aggregate processing cost for the first set of operations when utilizing the determined actual processing cost instead of the estimated processing cost for the at least one of the first set of operations.

7. The one or more computer-readable storage devices of claim 1, comprising further computer-executable instructions for utilizing a signature of an operation to look up execution statistics collected from execution of the operation, from among the received execution statistics.

8. The one or more computer-readable storage devices of claim 7, comprising further computer-executable instructions for utilizing the signature of the operation to also look up materialization information indicating whether intermediate data output by execution of the operation has been materialized.

9. The one or more computer-readable storage devices of claim 1, comprising further computer-executable instructions for receiving, prior to the data processing job having been completed, at least some materialization information, indicating whether intermediate data output by execution of at least some of the first set of operations has been materialized; wherein the computer-executable instructions for selecting the second set of operations comprise computer-executable instructions for selecting the second set of operations based on both the received execution statistics and the received materialization information.

10. The one or more computer-readable storage devices of claim 9, wherein the computer-executable instructions for selecting the second set of operations comprise computer-executable instructions for determining an aggregate processing cost for each of the first set of operations and the second set of operations, the first and second sets of operations being semantically equivalent; and wherein further the computer-executable instructions for determining the aggregate processing cost comprise computer-executable instructions for fractionally reducing processing costs of operations in accordance with a fraction of intermediate data that has been materialized, as indicated by the materialization information.

11. The one or more computer-readable storage devices of claim 1, wherein the computer-executable instructions for selecting the second set of operations comprise computer-executable instructions for determining an aggregate processing cost for each of the first set of operations and the second set of operations, the first and second sets of operations being semantically equivalent; and wherein further an optimization policy specifies when the computer-executable instructions for determining the aggregate processing cost can be executed, the optimization policy being based on which execution statistics have been received.

12. The one or more computer-readable storage devices of claim 11, wherein the computer-executable instructions for selecting the second set of operations comprise further computer-executable instructions for determining that the aggregate processing cost for the second set of operations is less than the aggregate processing cost for the first set of operations by an amount corresponding to a cost of transitioning from execution of the first set of operations to execution of the second set of operations as part of the data processing job.

13. One or more computer-readable storage devices comprising computer-executable instructions for transitioning from execution of a first set of operations to execution of a second set of operations, the second set of operations being semantically equivalent to the first set of operations, the transitioning occurring after commencing, but prior to completing, a data processing job, the computer-executable instructions directed to steps comprising:

selecting one or more operations from among the second set of operations, the selected one or more operations included in a computer-executable program;

searching the first set of operations for a semantically equivalent one or more operations;

comparing the selected one or more operations from the second set of operations to a found semantically equivalent one or more operations from the first set of operations, if the searching finds the semantically equivalent one or more operations, the found semantically equivalent one or more operations from the first set of operations different but functionally equivalent to the selected one or more operations from the second set of operations and configured to provide a same result as the selected one or more operations from the second set of operations;

replacing the semantically equivalent one or more operations from the first set of operations with the selected one or more operations from the second set of operations if the comparing finds differences; and adding the selected one or more operations from the second set of operations if the searching does not find semantically equivalent one or more operations in the first set of operations.

14. The one or more computer-readable storage devices of claim 13, wherein the computer-executable instructions for selecting the one or more operations from among the second set of operations are executed as part of a bottom-up traversal of the second set of operations.

15. The one or more computer-readable storage devices of claim 13, wherein the computer-executable instructions for searching comprise computer-executable instructions for comparing operations from among the second set of operations whose outputs act as inputs to the selected one or more operations from among the second set of operations with operations from among first second set of operations.

16. A system for implementing a data processing job, the system comprising:

an optimizer, at least partially implemented by at least one or more processing units, configured to perform steps comprising:

selecting a computer-executable program that includes a first set of operations to carry out the data processing job;

augmenting at least some operations, of the first set of operations, in the computer-executable program to comprise computer-executable instructions for collecting execution statistics quantifying execution of the augmented operations, the execution statistics being indicative of at least the runtime performance of the first set of operations;

receiving at least some of the execution statistics prior to the data processing job having been completed;

selecting, based on the received execution statistics, a second set of operations that are semantically equivalent to the first set of operations, the semantically equivalent second set of operations different but functionally equivalent to the first set of operations and configured to provide a same result as the first set of operations; and proceeding with the data processing job with the second set of operations; and a scheduler configured to perform steps comprising:

selecting one or more operations from among the second set of operations;

searching the first set of operations for a semantically equivalent one or more operations;

comparing the selected one or more operations from the second set of operations to a found semantically equivalent one or more operations from the first set of operations, if the searching finds the semantically equivalent one or more operations;

replacing the semantically equivalent one or more operations from the first set of operations with the selected one or more operations from the second set of operations if the comparing finds differences; and adding the selected one or more operations from the second set of operations if the searching does not find semantically equivalent one or more operations in the first set of operations.

17. The system of claim 16, wherein the optimizer is further configured to determine a signature for the augmented operations; wherein the received execution statistics comprise signatures identifying operations from which they were collected.

18. The system of claim 16, wherein the optimizer is further configured to determine, prior to the selecting the computer-executable program that includes the first set of operations, an aggregate processing cost for each of the first set of operations and the second set of operations, the first and second sets of operations being semantically equivalent, the determining comprising estimating a processing cost for operations of the first set of operations and for operations of the second set of operations;

wherein the selecting the second set of operations based on the received execution statistics comprises determining, from the received execution statistics, an actual processing cost of at least one of the first set of operations, the determined actual processing cost differing from an estimated processing cost for the at least one of the first set of operations such that the aggregate processing cost for the second set of operations is now lower than the aggregate processing cost for the first set of operations when utilizing the determined actual processing cost instead of the estimated processing cost for the at least one of the first set of operations.

19. The system of claim 16, wherein the optimizer is further configured to receive, prior to the data processing job having been completed, at least some materialization information, indicating whether intermediate data output by execution of at least some of the first set of operations has been materialized; wherein the selecting the second set of operations comprises selecting the second set of operations based on both the received execution statistics and the received materialization information.

20. The system of claim 16, further comprising multiple nodes executing in parallel, the multiple nodes executing the data processing job in accordance with a currently selected set of operations, as selected by the optimizer.

* * * * *